US008902040B2

(12) United States Patent
Greisen et al.

(10) Patent No.: US 8,902,040 B2
(45) Date of Patent: Dec. 2, 2014

(54) ELECTRONIC LOCK AND METHOD

(75) Inventors: David J. Greisen, Washington, DC (US); Daniel H. Greisen, Kirkland, WA (US)

(73) Assignee: Greisen Enterprises LLC, Anchorage, AK (US)

( * ) Notice: Subject to any disclaimer, the term of this patent is extended or adjusted under 35 U.S.C. 154(b) by 212 days.

(21) Appl. No.: 13/199,089

(22) Filed: Aug. 18, 2011

(65) Prior Publication Data

US 2013/0043973 A1 Feb. 21, 2013

(51) Int. Cl.
*G05B 19/00* (2006.01)
*G07C 9/00* (2006.01)

(52) U.S. Cl.
CPC ........ *G07C 9/00571* (2013.01); *G07C 2209/08* (2013.01); *G07C 9/0069* (2013.01); *G07C 9/00817* (2013.01)
USPC ........... 340/5.51; 340/5.1; 340/5.2; 340/5.21; 340/5.22; 340/5.28; 70/266; 707/698; 707/747

(58) Field of Classification Search
USPC ............... 340/5.51, 5.1, 5.2, 5.21, 5.22, 5.28, 340/5.54, 5.7; 70/266–274; 707/698, 747
See application file for complete search history.

(56) References Cited

U.S. PATENT DOCUMENTS

| | | | |
|---|---|---|---|
| 4,717,816 | A | 1/1988 | Raymond et al. |
| 4,760,393 | A | 7/1988 | Mauch |
| 4,851,828 | A | 7/1989 | Yamashita |
| 4,986,099 | A | 1/1991 | Johnson et al. |
| 4,988,987 | A | 1/1991 | Barrett et al. |
| 5,089,692 | A | 2/1992 | Tonnesson |
| 5,140,317 | A | 8/1992 | Hyatt, Jr. et al. |
| 5,198,643 | A | 3/1993 | Miron et al. |
| 5,260,551 | A | 11/1993 | Wilk et al. |
| 5,397,884 | A | 3/1995 | Saliga |
| 5,463,546 | A | 10/1995 | Parkhurst |
| 5,477,041 | A | 12/1995 | Miron et al. |
| 5,541,585 | A | 7/1996 | Duhame et al. |
| 5,591,950 | A | 1/1997 | Imedio-Ocana |
| 5,673,034 | A | 9/1997 | Saliga |
| 5,699,514 | A * | 12/1997 | Durinovic-Johri et al. ..... 726/19 |
| 5,742,236 | A | 4/1998 | Cremers et al. |
| 5,773,803 | A | 6/1998 | Fukuta |
| 5,774,058 | A | 6/1998 | Henry |

(Continued)

FOREIGN PATENT DOCUMENTS

| | | |
|---|---|---|
| WO | WO2006091301 | 8/2006 |
| WO | WO2007080508 | 7/2007 |
| WO | WO2010050807 | 5/2010 |

*Primary Examiner* — Steven Lim
*Assistant Examiner* — Ryan Sherwin
(74) *Attorney, Agent, or Firm* — Hinshaw & Culbertson LLP

(57) ABSTRACT

An electronic lock, system and method for dynamic controlled access, without the lock communicating with or connected to a code server, are provided. The lock includes a locking mechanism, a clock, a microprocessor, and a memory storing a hash function and programmed instructions for the microprocessor to perform certain operations. The microprocessor and memory may be comprised in a microcontroller. When an access code is entered into the lock, the lock microcontroller hashes currently valid access start date/duration combinations with lock identifying data to return valid access codes. If the entered access code equals any of the valid access codes, the locking mechanism is opened. The lock identifying data may include data stored by a lock manufacturer and/or data created by a lock owner. Static access codes may also be programmed into the lock if desired. Caching of valid access codes may be used to reduce processing time.

40 Claims, 5 Drawing Sheets

(56) References Cited

U.S. PATENT DOCUMENTS 5,774,059 A 6/1998 Henry et al.
5,872,513 A 2/1999 Fitzgibbon et al.
5,887,065 A 3/1999 Audebert
5,894,277 A 4/1999 Keskin
5,933,085 A 8/1999 Holcomb et al.
5,936,544 A 8/1999 Gonzales et al.
5,937,068 A 8/1999 Audebert
RE36,426 E 12/1999 Wilk et al.
6,130,621 A * 10/2000 Weiss .......................... 340/5.28
6,157,315 A 12/2000 Kokubo et al.
6,161,185 A * 12/2000 Guthrie et al. .................... 726/5
6,300,873 B1 10/2001 Kucharezyk et al.
6,317,025 B1 11/2001 Leon et al.
6,380,842 B1 4/2002 Mattes
6,691,921 B2 2/2004 Endo et al.
6,776,331 B2 8/2004 Plummer
6,837,440 B2 1/2005 Lin
6,934,855 B1 8/2005 Kipnis et al.
6,941,285 B2 9/2005 Sarcanin
6,975,202 B1 12/2005 Rodriguez et al.
7,009,489 B2 3/2006 Fisher
7,015,791 B2 3/2006 Huntzicker
7,025,260 B1 4/2006 Stevens et al.
7,057,494 B2 6/2006 Fitsgibbon
7,083,089 B2 8/2006 Hopkins
7,099,474 B1 8/2006 Liden et al.
7,102,498 B2 9/2006 Desai et al.
7,102,507 B1 9/2006 Lauren
7,137,553 B2 11/2006 Register, Jr. et al.
7,193,503 B2 3/2007 Fisher
7,196,610 B2 3/2007 Stramann et al.
7,229,009 B1 6/2007 Parsons et al.
7,283,040 B2 10/2007 Caren
7,287,693 B2 10/2007 Brookner
7,301,437 B2 11/2007 Sasaki et al.
7,314,167 B1 1/2008 Kilicote
7,314,169 B1 1/2008 Jasper et al.
7,347,366 B2 3/2008 M'Raihi
7,353,396 B2 4/2008 Micali et al.
7,382,226 B2 6/2008 Monnier
7,427,033 B1 * 9/2008 Roskind ........................ 235/492
7,429,910 B2 9/2008 Domenz et al.
7,441,697 B2 10/2008 Fletcher
7,446,644 B2 11/2008 Schaffzin et al.
7,448,538 B2 11/2008 Fletcher
7,471,187 B2 12/2008 Nakashima
7,478,748 B2 1/2009 Buttross et al.
7,511,602 B2 3/2009 Huntzicker
7,535,367 B2 5/2009 Ratnaker
7,543,755 B2 6/2009 Doi et al.
7,552,467 B2 6/2009 Lindsay
7,600,680 B2 10/2009 Roth
7,650,509 B1 * 1/2010 Dunning ....................... 713/184
7,683,758 B2 3/2010 Denison
7,701,331 B2 4/2010 Tran
8,272,038 B2 * 9/2012 Husemann et al. ............... 726/3
2003/0038733 A1 2/2003 Willats et al.
2004/0041693 A1 3/2004 Matsubara et al.
2004/0049675 A1 3/2004 Micali et al.
2004/0227642 A1 11/2004 Giles et al.
2004/0232229 A1 11/2004 Gottfried et al.
2005/0051621 A1 3/2005 Wong et al.
2006/0028353 A1 2/2006 Mueller et al.
2006/0097845 A1 5/2006 Yoshizaki et al.
2007/0132550 A1 * 6/2007 Avraham et al. ............. 340/5.21
2007/0182582 A1 8/2007 Booher et al.
2007/0200668 A1 8/2007 Kurpinski et al.
2007/0267489 A1 11/2007 Borodulin
2007/0290793 A1 12/2007 Tran
2008/0041943 A1 2/2008 Radicella et al.
2008/0074235 A1 3/2008 Wong et al.
2008/0265023 A1 10/2008 Nasimi
2008/0297370 A1 12/2008 Farris et al.
2009/0146830 A1 6/2009 Ogiso
2009/0229321 A1 9/2009 Eccles
2010/0052337 A1 3/2010 Arabia et al.
2010/0090817 A1 4/2010 Yamaguchi et al.

* cited by examiner

ELECTRONIC LOCK AND METHOD

FIELD OF THE INVENTION

The present invention relates to electronic locks, systems and methods for providing dynamic access without a lock communicating with a remote server. More particularly, it relates to coded-entry locks having a plurality of valid access codes at any given time corresponding to a plurality of overlapping time periods of validity that include the given time.

BACKGROUND OF THE INVENTION

Electronic locks are widely used in situations in which it is desired to provide a guest or customer (termed generically "guest" herein) with secure access to something (e.g., a hotel room, a locked bicycle or motor vehicle, or a safe or storage locker) for an agreed upon period of time, as they can typically be programmed to accept a certain code, radio frequency, magnetic card or other entry means for the time period and then reprogrammed at the end of the time period to no longer accept the entry means. Electronic locks may be grouped into two basic categories, namely, coded locks having some type of manual code-entry interface (e.g., keypad, touch screen, microphone, etc.) and keyed locks coupled with a physical electronic key such as a magnetic card or RFID device, for example. Some locks provide both coded access and keyed access. In turn, both types of locks may be considered to fall into two subcategories, namely, un-networked locks, and networked locks.

Un-networked coded locks allow the owner to program in a number of static (i.e., not automatically changing) codes to open the lock. These locks, being self-contained, are relatively simple to design and install. However, static access codes have a serious security flaw in that an unauthorized user who has obtained the static access code will have access to the lock until the code is manually changed. Therefore, to reduce the potential of a security breach, the lock owner must establish a tedious routine of regular manual reprogramming of lock codes at the locus of the lock. This burden is multiplied when the lock owner has several locks to maintain. In the case of keyed, un-networked locks, systems do exist in which a centrally located device encodes a key device with an old lock code and instructions to reprogram the lock with a new lock code, such that when the key device is presented to the lock, the old lock code is deactivated and the new lock code is activated. The same key device then provides access to the lock until the lock is similarly reprogrammed by the presentation of another key device with another new lock code. This type of system has the disadvantage of requiring electronic key devices, which must be physically transferred from a manager to a guest, for example in person or by mail, and may be lost, stolen or damaged. Also, additional specialized hardware is required in the form of some type of central device that communicates with or otherwise operatively connects to a key device to program the key device, introducing another expense and complicating setup and operation of the system.

Networked locks, on the other hand, allow one or more locks in communication with a network to be reprogrammed remotely from a central network command terminal. This type of system has the benefit of reducing reprogramming time and effort, especially where multiple locks require reprogramming, when automatic reprogramming of multiple locks can be initiated by a single human command, eliminating the need for a repetitive human task. Remote administration of a plurality of locks widely disbursed around a geographic area is also made possible, as is useful in managing summer home rentals, for example. Alternatively, the command terminal can be programmed to automatically reprogram the locks in the system at certain times, for example at predetermined time intervals, thus eliminating altogether the need for a human reprogramming action. However, networked systems have the disadvantage of requiring additional wiring or wireless lock hardware, and are potentially subject to network connectivity failures.

In view of the foregoing, it can be seen that existing electronic lock systems are either unduly complex in their operation and/or installation or insufficiently secure. A need therefore exists for a lock, system and method that provide dynamic controlled access to un-networked locks without requiring regular human maintenance.

BRIEF SUMMARY OF THE INVENTION

In accordance with one aspect of the present invention, an electronic lock is provided for dynamic controlled access, which may typically be physical access to a building, room, safe, bicycle, or motor vehicle, but may also be access to secure data, for example. In physical embodiments, the lock includes a mechanical locking mechanism, a clock configured to track the current time, a microcontroller, a memory storing a hash function, and a human interface device configured to permit a human user to input an access code and to transmit the access code input by the human user to the microcontroller. The memory contains programmed instructions for the microcontroller to receive a signal from the clock to determine the current time and a signal from the human interface device indicating an input access code. The microcontroller then automatically determines a plurality of valid arguments for the hash function, each of the valid arguments including data representing a time period that includes the current time, the evaluation of the hash function at each of the valid arguments returning a valid access code that is a hash of the valid argument, each valid argument and each valid access code remaining valid during the corresponding time period. A first one of the valid arguments is hashed by the microcontroller to return a first valid access code corresponding to the first valid argument, and the microcontroller compares the input access code to the first valid access code to determine whether the input access code equals the first valid access code. If there is a match, the microcontroller opens the lock, which for a physical lock means opening mechanical locking mechanism. Otherwise, for each time the input access code is compared to a valid access code and does not match the valid access code, the microcontroller hashes another of the valid arguments to return another valid access code and compares the input access code to the other valid access code, until either the input access code equals one of the valid access codes or the input access code has been compared to all of the valid access codes and does not match any of the valid access codes. If the input access code is compared to one of the valid access codes and equals the valid access code, the microcontroller unlocks the mechanical locking mechanism.

In one embodiment, where an invalid input failure is defined as the input access code being compared to the valid access code corresponding to each valid argument and no match being found, the lock is further programmed to prohibit access code input via the human interface device for a predetermined amount of time if a predetermined impermissible number of input failures have occurred within a predetermined time interval.

In another embodiment, the lock further comprises a time signal receiver and a time signal antenna, the lock further programmed with instructions to periodically receive time data from the time signal receiver and update the clock to the current time.

In still another embodiment, the lock further comprises a personal computing device (PCD) interface, the lock further programmed with instructions to accept programming instructions from a PCD through the PCD interface.

In yet another embodiment, the lock further comprises a personal computing device (PCD) interface, the lock further programmed with instructions to send data to a PCD through the PCD interface.

In still another embodiment, the lock is further programmed with instructions to enter the programming mode when the microcontroller authenticates, through the PCD interface, a PCD that has been authorized to interact with the electronic lock.

The time periods of lock validity may be assigned different properties according to the purpose of the lock. For example, the time periods of lock validity preferably comprise at least two valid time periods of different duration at any given current time. Also preferably, the time periods comprise at least two time periods having a different start time. Also preferably, there are at least four time periods valid at any given time. In yet another embodiment, each time period is a continuous, non-recurring time period beginning at a single start time and ending at a single end time. In still another embodiment, the time periods include at least one periodically recurring time period. All of the foregoing properties of time periods may for example be useful for a property manager to be able to generate and provide a single access code to a rental guest that will be valid during (and only during) one of many possible stay periods of various start dates and durations.

In still another embodiment, the time periods include at least one periodically recurring time period and at least two discrete, uninterrupted time periods, each discrete time period beginning at a single start time and ending at a single end time. The discrete time periods may for example correspond to a single discrete stay period for a rental guest, whereas the recurring time period may correspond to a recurring time period of access for cleaning staff, for example on a particular day of every week.

In yet another embodiment, the time periods including each of a set of valid use periods of a discrete number of consecutive days ranging from one day to n days, the use periods including at least a part of the first day and the last (nth) day and the entirety of any days in between, a use period being valid if it includes the time at which the access code is input. Typically, for guest use of a rental property, it may be desirable for n to be at least 7.

In still another embodiment having enhanced security, each valid argument further includes further data input into the human interface device, in addition to the input access code, each time an access code is input into the human interface device. The further data may for example be a realtor ID pertaining to a particular realtor who is authorized to receive access codes for the lock. In that example, the microcontroller may evaluate the hash function at valid arguments only if the additional input data equal the realtor ID, so that the microcontroller avoids wasting battery power performing hashes in response to input by unauthorized users.

In yet another enhanced-security embodiment, each valid argument further includes a secret code associated with the electronic lock. The secret code may for example be pre-set by a manufacturer. In addition, each valid argument may further include a programming code that is selected by a user and stored in the electronic lock. In contrast to the realtor ID example above, which is entered each time an input access code is entered, the programming code may be stored only once and automatically included in the valid argument each time a hash is subsequently performed.

In still another embodiment, caching may be used to minimize lock power usage. For example, rather than recalculating valid access codes each time an input access code is entered, the lock microcontroller may be further programmed with instructions to cache valid access codes, each time an input access code is received, to compare the input access code to any valid cached access codes, and if a match is found, unlock the mechanical locking mechanism. In a particular caching embodiment, the lock is further programmed with instructions to each time an argument becomes valid, hash automatically the newly valid argument to return the corresponding valid access code, and cache automatically the corresponding valid access code in a memory, and each time a valid access code becomes invalid, delete automatically the newly invalid access code from the memory. Each time an input access code is received, the microcontroller compares the input access code to any valid access codes cached in the memory, until a match is found between the input access code and one of the valid access codes cached in the memory, or until the input access code has been compared with all the valid access codes cached in the memory and no match has been found. If a match is found, the microcontroller unlocks the mechanical locking mechanism.

In still another caching embodiment, the lock is programmed with instructions to cache automatically each newly valid argument in a memory when it becomes valid, delete automatically any newly invalid argument from the memory when it becomes invalid, each time a valid argument is hashed to return a valid access code, automatically cache the valid access code in the memory and automatically delete the corresponding valid argument from the memory. In addition, each time a valid access code in the memory becomes invalid, the lock automatically deletes the newly invalid access code from the memory. Each time an input access code is received, the microcontroller compares the input access code to any valid access codes cached in the memory, until a match is found between the input access code and one of the valid access codes cached in the memory, or until the input access code has been compared with all the cached valid access codes and no match has been found. If a match is found between the input access code and one of the cached valid access codes, the microcontroller unlocks the mechanical locking mechanism. On the other hand, if and when the input access code has been compared with all the cached valid access codes, no match has been found, and any valid argument remains cached in the memory, the microcontroller hashes each remaining cached valid argument in turn to return a newly calculated valid access code and compares the input access code to each newly calculated valid access code, until a match is found or until no valid arguments remain in the memory and no match has been found. If a match is then found between the input access code and one of the newly calculated valid access codes, the microcontroller unlocks the mechanical locking mechanism.

In yet another embodiment having enhanced flexibility, one or more static (i.e., not automatically changing) access codes may be stored in the lock memory. The lock is then further programmed with instructions to compare the input access code to any stored static access codes, and if the input access code equals any stored static access code, the microcontroller unlocks the mechanical locking mechanism.

In still another enhanced-security embodiment, the lock is further programmed with instructions to store in the lock memory for a predetermined time a log of recent access attempts, the log including, for each attempt, data indicating the time of the attempt and whether the attempt was successful.

In another aspect of the present invention, a security system for dynamic controlled access is provided. The security system comprises a lock, substantially as described above, and a code server storing codes and other information pertaining to the lock, the code server preferably not being in communication with the lock. In particular, the code server comprises a microprocessor and a memory storing the same hash function stored in the lock memory. The code server is programmed with instructions to prompt a user to enter a prospective time period for which access to the lock is desired, to evaluate the hash function at the argument corresponding to a time period entered by a user via a user device to return a corresponding access code, and to transmit the corresponding access code to the user, the transmitted access code being valid during the entered time period.

In one embodiment of the system, the code server is programmed with instructions to transmit the access code to a user device. Either the transmission to the user device or instructions separately stored on the user device may include instructions for the access code to be displayed on a display device operatively connected to the user device. In such case, the lock human interface device includes manual entry means for inputting the displayed access code.

Alternatively, the code server may transmit the access code to be stored in the user device in a machine-readable format without display, and the lock human interface device may be adapted to read the transmitted access code directly from the user device when a user presents the user device to the human interface device.

In another embodiment of the system, the code server memory stores a plurality of hash functions and their respective correspondence to a plurality of electronic locks. The code server is further programmed with instructions to prompt a user to enter information identifying a lock, and, upon receiving information identifying one of the plurality of electronic locks, to determine the hash function corresponding to the identified lock, and to evaluate the hash function corresponding to the identified lock at the argument corresponding to the entered time period to return an access code valid for the identified lock during the entered time period. Each of the plurality of hash functions may be unique with respect to the rest of the plurality of hash functions, or the plurality of hash functions may include two or more identical hash functions. The former increases the security of any given lock, while the latter is useful wherever it would be useful for more than one traditional lock to have the same physical key, as in locks to multiple doors to the same residence or vehicle, for example.

In one example, each of the plurality of hash functions may be generated from a common hash function by aggregating to the argument of each hash function a lock identifying code. The lock identifying code may comprise a programming code that is selected and stored in the code server and in the lock memory by a user and/or a pre-set (e.g., by the lock manufacturer) secret code stored in the code server and in the lock memory.

In conjunction with the multiple-lock embodiment, the information identifying a particular lock may include a reset code provided to the lock owner upon purchase of the lock and a lock serial number. The code server memory stores in association with the lock identifying information a hash of a lock verification argument that includes at least the reset code, the lock serial number, and a security key stored in the code server, without the code server storing the reset code itself. This helps to keep the reset code secure. In such case, the code server is further programmed with instructions to prompt a user to input the reset code, to hash the lock verification argument to generate a lock verification hash, and to compare the lock verification hash with the stored hash. Then, only if the lock verification hash equals the stored hash, the code server proceeds to evaluate the hash function at the argument corresponding to the entered time period to generate the access code valid for the identified lock during the time period.

In still another embodiment of the system adapted for flexible lock usage, a static access code is stored in the lock memory and may be used to open the lock substantially as described above. Optionally, the code server may also store any static access code(s) that are stored in the lock.

In yet another aspect of the invention, a method of providing dynamic controlled access is provided. The method comprises providing an electronic lock substantially as described above, evaluating the hash function at an argument including a prospective time period during which access is to be granted to a guest to obtain a guest access code that will be valid during the prospective time period, and providing the guest access code to the guest before the start of the prospective access time period for use during the prospective access time period. In particular, evaluating the hash function may comprise submitting lock information and the prospective time period to a code server, substantially as described above with respect to the code server aspect of the invention, to cause the code server to evaluate the hash function and return a valid access code for the prospective time period.

DETAILED DESCRIPTION OF THE INVENTION

With reference to the accompanying Figures, in accordance with the present invention, a lock, system and method for providing low-maintenance, dynamic access to an un-networked lock are described in this section. That is, the lock is automatically reprogrammed periodically without communicating with a remote server. In this way, the lock, for example, allows a property manager to give a guest a code that will allow the guest to enter a rental property for only the period of the guest's stay. Currently, a manager must either manually change the code after the guest's stay is complete, the lock must connect to a network, or the lock must be reprogrammed by a key device that instructs the lock to change its access "code" from an old code to a new code. It is to be understood for the purposes of this description that "code," unless otherwise specified, can refer either to an electronic signal or pattern associated with a key device or to a sequence of alphanumeric or other symbols representing for human reference an electronic signal or pattern that is programmed into a key device or manually entered into a lock via an interface device such as a keypad, touch screen, or microphone, for example. Although the illustrated embodiments include a lock with a mechanical locking mechanism for securing a physical space or object, it will be understood by those skilled in the art that the present invention also applies to "locks" in the sense of secured electronic access gateways, such as, for example, password-protected access gateways to an electronic device or to information stored in an electronic device or network of electronic devices.

It will also be noted that throughout this description, the individual performing an action is sometimes referred to as a "user." The same user need not perform all the actions described. One user, such as a property manager, for example, who is authorized to obtain access codes from the code server, might do so to obtain an access code and then give that access code to another user, such as a property guest, for example, to actually open the lock. Similarly, "user device" may refer to any device employed by a user to communicate with a code server or receive or display a code returned by a code server. Typical user devices may include Personal Computing Devices (PCD), such as smartphones, PDAs or tablets, or other devices such as desktops or even a monitor and mouse/keyboard attached to the code server itself.

Figure 1:
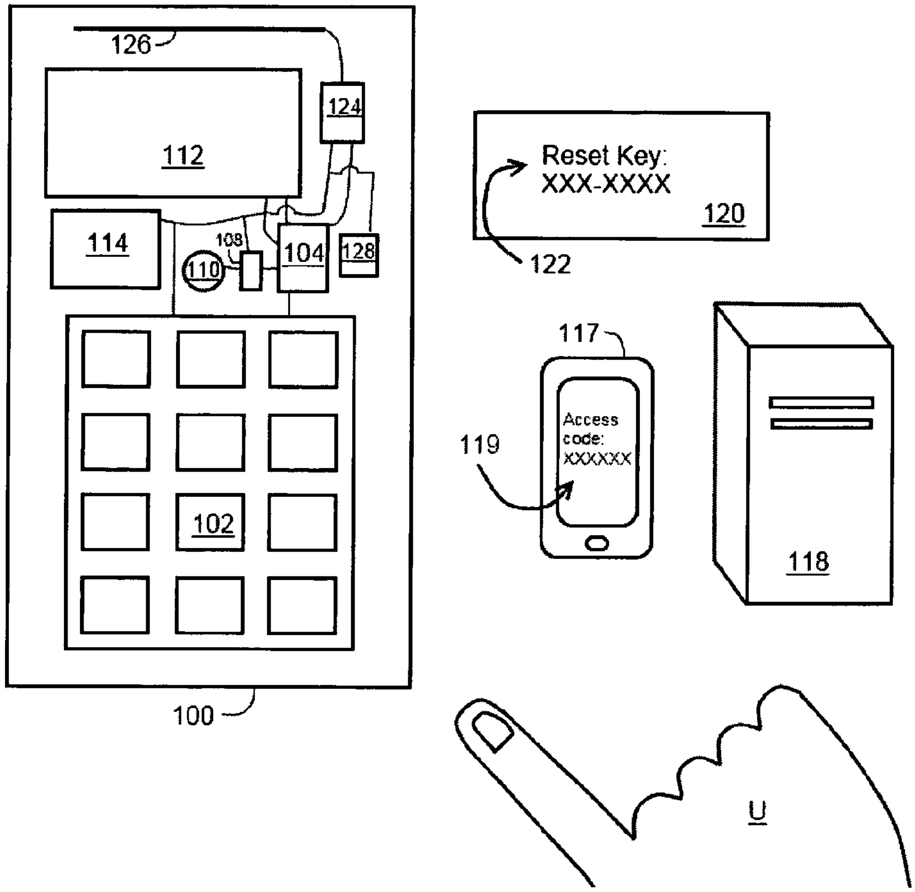
FIG. 1 shows a diagram of a lock in accordance with the present invention.

With reference to FIG. 1, a cutaway view of lock 100 is presented, including a user interface depicted as a keypad 102 for inputting codes, a microcontroller 104, a clock 108, a clock backup battery 110, a mechanical locking mechanism 112, and a primary battery 114. Also illustrated in FIG. 1 are the optional components of a time-signal receiver 124 and a time-signal antenna 126 for use in a preferred embodiment, as well as an optional device-to-device interface 128 for use in another preferred embodiment, both embodiments described in more detail below. In a preferred aspect that may be incorporated into many embodiments of the invention, microcontroller 104 stores one or more lock identifying codes that are also stored on a code server 118. It will be understood that code server 118 also includes a microprocessor (not shown). The lock identifying codes may include, for example, a secret code 204 permanently associated with lock 100 and a programming code 208 created by a user, as will be explained in more detail below.

Microcontroller 104 also stores a hash function, and the memory of code server 118 stores the same hash function. The memory in code server 118 could be volatile memory such as RAM, or non-volatile memory such as a hard disk. As is understood in the art, a hash function is a function that operates on arguments that may include an unlimited range of inputs as one or more variables or sequences of bits, but maps those arguments onto a discrete range of output values, such as, for example, the range of possible six-digit numeric sequences, as in the illustrated embodiment, preferably obtaining each possible output value with approximately uniform frequency, to maximize randomness and thus security. As is known to those skilled in the art, the act of evaluating a hash function at an argument to generate an output value may be termed "hashing" the argument, and the generated output value itself may be termed a "hash value" or simply a "hash" of the argument. As will be understood from the present description, a particularly useful type of hash function for the purposes of the present invention is a cryptographic hash function, which accepts a string of any arbitrary length as input to produce a fixed-length output, such as the aforementioned six-digit numeric sequence.

Accordingly, by hashing an argument that includes an identified stay period in any suitable predefined manner (for example as a combination of a start date and a duration of stay, a start date and an end date, or a duration of stay and an end date) code server 118 generates and returns an access code 119 that can be validated by lock 100. Optionally but preferably, the hashed argument additionally includes one or more lock-identifying codes as a fixed variable/data string that uniquely identifies lock 100. In a preferred embodiment, access code 119 would be transmitted to a user device 117 for display to User U, but other suitable ways of code server 118 returning access code 119, such as by transmitting access code 119 to user device 117 for user device 117 to "speak" access code 119 to user U through an audio output device or transmitting access code 119 as data to an electronic key device (not shown), are also within the scope of the invention. In the different modes of returning access code 119, the data transmitted from server 118 need not necessarily be different. Rather, the received data may only be processed differently by user device 117, such as when user device 117 is a client (personal computer, e.g.) that converts the data to a display image or an audio output presented to user U on a client display or client audio device, or when user device 117 is an electronic key that converts the data to an RFID signal or electromagnetic signature readable by a reader device (not shown) operatively connected to lock 100. When access code 119 returned by code server 118 is entered into lock 100, lock 100 will hash every valid stay period (i.e. every stay period that includes the day on which access code 119 is entered into lock 100) and compare the resulting hashes with access code 119. Caching can be used to reduce processing time, as will be described in more detail below. If access code 119 is equal to one of the hashes, then lock 100 is opened. Otherwise, if access code 119 is compared with all resulting hashes and no match is found, lock 100 is not opened, and lock 100 may optionally display a message indicating that access code 119 is invalid.

There must be a finite number of valid date/duration combinations at any one time; otherwise any code would be valid. If the maximum duration is 14 days, then there would be 105 codes valid at any one time (14+13¬ + . . . +2+1). If codes are six digits, then the codes have nearly 4 digits of entropy.

For example, if a guest will be staying at a rental for 4 days starting on Jan. 5, 2012, the manager inputs that information into code server 118, for example by entering the appropriate data into a web page, which then sends the data to code server 118, as in one preferred embodiment, which eliminates the need for a property manager to maintain any local server hardware. Code server 118 hashes the date, the number of days, secret code 204 and programming code 208 and returns access code 119 as a six digit hash. Access code 119 is the code to enter the rental on any day of the stay period Jan. 5-9, 2012.

The manager gives access code 119 to a guest. On January 5 the guest enters access code 119. Lock microcontroller 104 hashes the date January 5, a one day duration, secret code 204 and programming code 208. It then compares the resulting hash to access code 119 and finds that they are not equal. It then does the same for two- and three-day durations and finds that they are not equal either. When it hashes a four-day duration, it finds that access code 119 is equal to the hash and opens lock 100. When the guest enters the code on January 6, lock microcontroller 104 will hash January 6 with durations of 1 through 14 days, then January 5 with durations of 2 through 3 days before finding access code 119 to be valid when it hashes January 5 with a duration of 4 days. If the guest attempts to reenter the rental on January 10, lock microcontroller 104 will hash and compare January 10 with durations of 1 through 14 days, January 9 with durations of 2 through 14 days, all the way to December 28 with a duration of 14 days, at which point it will determine access code 119 to be invalid, and lock 100 will not be opened. Optionally, lock 100 will display a message indicating that access code 119 is invalid.

As illustrated in FIG. 1, a user U can enter codes into a keypad 102, which electrically connects via leads to a lock microcontroller 104. It will be understood that, wherever a "microcontroller" is referred to herein, any suitable combination of a microprocessor and a memory capable of performing equivalent functions may be substituted. Also, wherever the term "programming" is used," it will understood to mean storing data in a memory or storing programmed instructions in a memory, the instructions to be performed by a microprocessor, as applicable in the relevant context. Lock microcontroller 104 electrically connects via leads to a clock 108 and a lock mechanism 112. Clock 108 electrically connects via leads to a backup battery 110 to provide power if primary power is lost. Microcontroller 104 receives data from keypad 102, can poll clock 108 for date/time data, and can send a control signal to unlock lock 100. Primary battery 114 provides primary power to microcontroller 104, clock 108, lock mechanism 112, and keypad 102 (for example, to backlight keypad 102). For the dynamic access control of lock 100 to function, it must be used in conjunction with code server 118. Without code server 118, lock 100 can function as a traditional static access control mechanism. Code server 118 is a piece of software running on a standard computer that accepts a user request for an access code and returns an access code. Code server 118 is not connected to, or in communication with, lock 100.

When lock 100 is constructed, the manufacturer programs secret code 204 and a reset code 122 into lock 100 (i.e., "pre-sets" secret code 204 and reset code 122), both unique to lock 100. It also packages lock 100 with a slip of paper 120 containing reset code 122.

Figure 2:
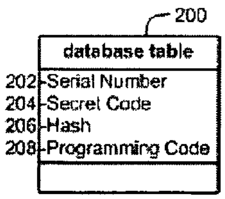
FIG. 2 shows a structure for a lock manufacturer's database in accordance with the present invention.

The manufacturer then records certain information in a database, as illustrated in FIG. 2. Each row in a lock table 200 corresponds to one lock 100, and includes: a serial number 202, secret code 204, and a tabulated hash 206 corresponding to the particular lock 100. The longer and more random secret code 204, the more secure the lock 100; for example, a preferred embodiment uses a 256 bit hardware-generated true random number. Tabulated hash 206 is a hash of reset code 122, serial number 202, and tabulated hash 206 could be a salted hash or use other means to increase the security of the reset code 122 on the server 118. Reset code 122 is a code that resets the lock to certain factory settings. For example, reset code 122 may clear any programming code 208 and/or any static access code(s) (not shown) from the memory of lock microcontroller 104, either automatically upon entry of reset code 122, or upon a user being prompted to confirm and confirming via another key entry on keypad 102 that the user desires to clear any or all of the foregoing. Tabulated hash 206 is used so that reset code 122 does not have to be stored on code server 118 thus ensuring the security of reset code 122. If reset code 122 is revealed, lock 100 is compromised.

Figure 3:
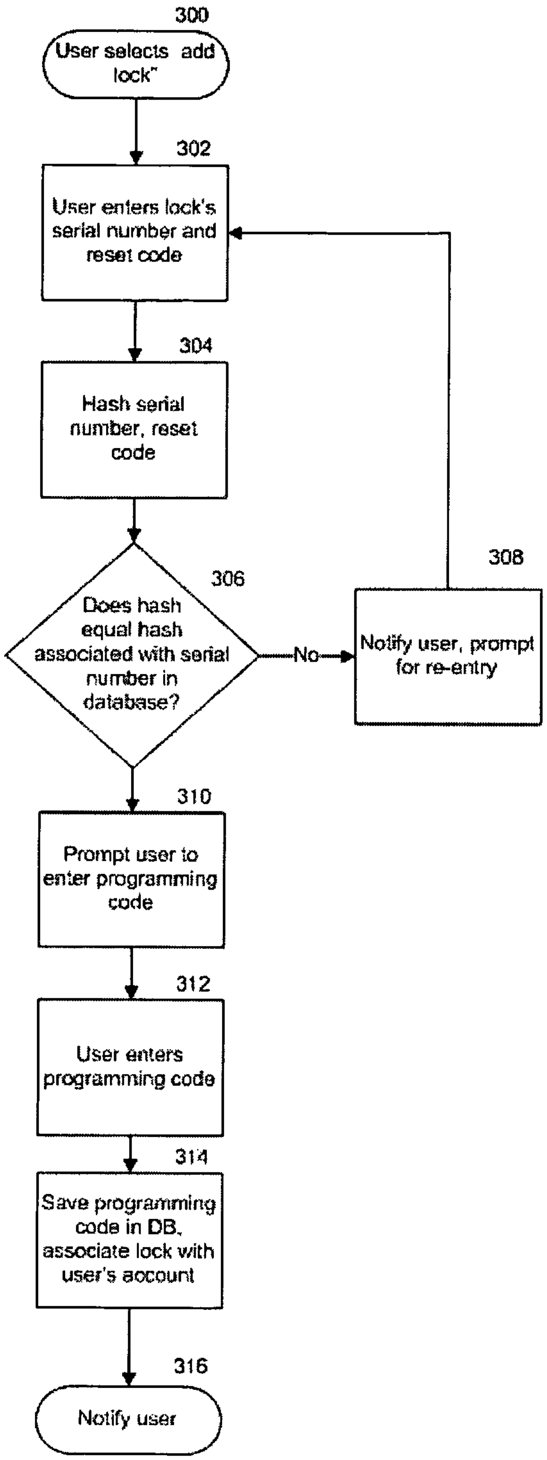
FIG. 3 shows steps to activate a lock in a code server in accordance with the present invention.

In order to use the dynamic access control functionality of lock 100, a user must first add lock 100 to code server 118. In a preferred embodiment, code server 118 is a remote server having a web front-end. However, code server 118 may alternatively be incorporated in a personal home or mobile computing device or any other suitable device capable of performing equivalent functions, with or without being remotely accessible via the internet or otherwise. First the user creates an account on server 118, if the user does not already have one, and logs in. If desired, server 118 may incorporate any suitable security measures to ensure that only an authenticated and authorized user may create an account. As but one example, without limitation, server 118 may require a user attempting to create an account to enter a server authorization code (not shown) provided to the user upon purchase of lock 100, either separately or as part of the packaging of lock 100. Hereinafter, it is assumed that a user interacting with server 118 is authenticated and authorized to the appropriate extent. FIG. 3 illustrates the steps for the user to add lock 100 to code server 118. After the user requests that a particular lock 100 be added in an add-request step 300, the user is prompted to enter and enters lock identifying information, such as serial number 202 and reset code 122, of the particular lock 100 in a lock data entry step 302. In a lock ID verification step 304, code server 118 hashes these values to generate a lock identity verification hash. In step 306, code server 118 compares the verification hash with tabulated hash 206 stored in lock table 200. If the verification hash does not match tabulated hash 206, code server 118 displays a message notifying the user in step 308 that a lock is not found, prompts the user to check whether serial number 202 and reset code 122 were entered correctly, and returns to lock data entry step 302. If the verification hash equals/matches tabulated hash 206, then code server 118 proceeds to step 310 and requests that the user enter a programming code 208. In step 312, the user chooses programming code 208 and enters it. In step 314, code server 118 saves programming code 208, and associates lock 100 with the user's account. In step 316, code server 118 notifies the user that lock 100 has been successfully added and associated with programming code 208.

In a preferred embodiment, programming code 208 is a seven digit number, but programming code 208 may be of any suitable number of digits or other characters so as to provide a sufficient variety of programming codes 208 for security purposes, while preferably keeping each programming code 208 sufficiently easy for a user to remember. A process similar to the foregoing may be performed to modify the programming code of a lock 100 that has already been added to code server 118, such as when lock 100 is acquired by a new lock owner who wishes to change programming code 208 for security purposes, or in the case that programming code 208 is compromised.

It will be noted that, since programming code 208 is stored in a memory of lock 100 and in code server 118, a user does not need to remember programming code 208 for everyday use in querying code server 118 to generate access codes 119 or in entering access codes 119 into lock 100 to open lock 100. However, in a preferred embodiment, programming code 208, in addition to being one of the variables included in (or forming part of the data string of) a hashed argument to generate access codes 119, may also be entered into keypad 102 of lock 100 to initiate a programming mode, as will be explained in more detail below. Therefore, where practical, as for example when the owner of a lock 100 is only managing one lock 100, the owner may find it useful to memorize programming code 208, whereas an owner of many locks 100 will, as a practical matter, typically be unable to memorize and thus need to record the corresponding programming codes 208 for use in entering the programming mode.

The user then stores programming code 208 in lock 100, in accordance with any suitable method. For example, the user may enter reset code 122 to enter a reset mode, in which lock 100 restores (or prompts the user to choose whether to restore) certain factory settings of lock 100, and prompts the user to enter programming code 208 so that programming code 208 may be stored in lock 100. As it is also essential that clock 108 keep track of the correct date and time, a user must be able to verify the date and time stored in lock 100. This should be done by any suitably secure method, to prevent abuse of access privileges, such as, for example, a guest modifying the date and time stored in lock 100 to prolong the guest's access. Therefore, access to verifying and adjusting the date and time of lock 100 may be granted, for example, every time reset code 122 is entered, and every time programming code 208 is entered to initiate the programming mode, while reset code 122 and programming code 208 are retained by the lock owner or manager and not provided to guests. In addition to verifying and adjusting the date and time stored in lock 100, the programming mode may also permit a user to store a static access code or codes which is/are valid at all times, for use by any authorized individuals who should always have access to lock 100. Optionally, a user may also store static access code(s) associated with lock 100 on server 118 so that they may be retrieved by an authorized user; otherwise, the user who stored static access code(s) in lock 100 may simply remember static access code(s) or record it/them elsewhere, such as in writing or on a personal electronic device. Once a user has stored programming code 208 and verified that the date and time stored in lock 100 are correct, lock 100 is ready for normal use.

Figure 4:
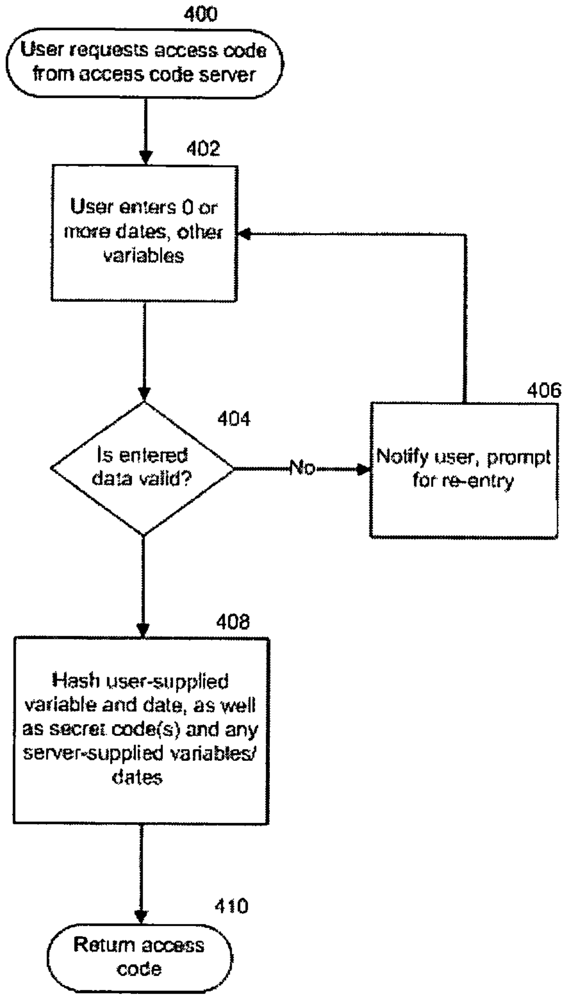
FIG. 4 shows steps to acquire an access code from a code server in accordance with the present invention.

To open lock 100, a user must first obtain a particular access code 119 from code server 118 that will be valid during the time period in which the user wishes to open lock 100. FIG. 4 illustrates the steps for a user to obtain an access code 119 from code server 118. After the user has requested an access code 119 in step 400, code server 118 prompts the user for information in a predefined format that is sufficient to identify a prospective time period of use or stay, such as (1) the date when the code should start working and (2) the number of days the code should remain valid, as in the illustrated embodiment. The user submits this information in step 402. In step 404, code server 118 confirms that the entered data is in an acceptable form and identifies an acceptable stay/use time period. In one preferred embodiment, the stay/use time period is limited to between 1 and 14 days. If the entered data is not valid, i.e., does not properly define such a time period, then code server 118 prompts the user to re-enter the data in step 406. If the entered/re-entered data is valid, then, in step 408, code server 118 hashes the data with secret code 204 and programming code 208. It then displays the resulting access code 119 to the user in step 410.

Figure 5:
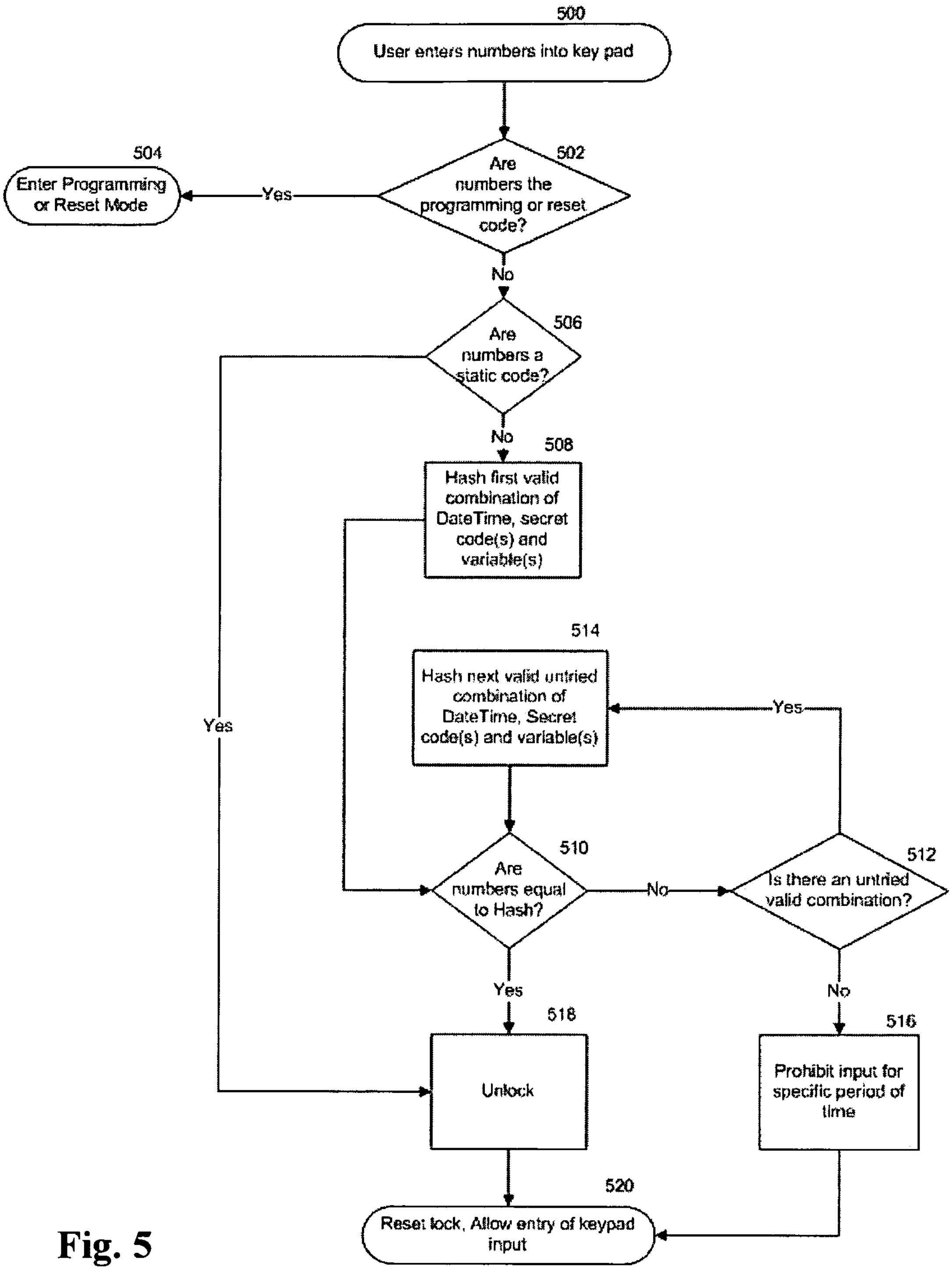
FIG. 5 shows steps to open the lock with an access code in accordance with the present invention.

Now that the user has access code 119, the user can enter it into lock 100. FIG. 5 illustrates the steps to open lock 100 or to enter the programming mode or reset mode. In step 500 the user enters a numeric sequence into keypad 102, which may be access code 119, programming code 208, reset code 122, or an invalid code. In step 502, lock microcontroller 104 registers that a numeric sequence has been entered and compares the entered numeric sequence to programming code 208 and reset code 122. If the entered numeric sequence is equal to either programming code 208 or reset code 122, microcontroller 104 initiates step 504, entering the programming or reset mode as appropriate; otherwise, the microcontroller proceeds to step 506. In step 506, lock microcontroller 104 compares the entered numeric sequence to all stored static access codes. If the entered numeric sequence is equal to a static access code, lock microcontroller 104 sends an unlock signal to lock mechanism 112 in step 518. Otherwise, in the preferred embodiment, lock microcontroller 104 hashes the first valid combination of date and duration in step 508, and compares the resultant hash with the entered numeric sequence step 510. If the resultant hash and entered numeric sequence are equal, lock microcontroller 104 proceeds to step 518, sending an unlock signal to lock mechanism. Otherwise, if there is a valid combination of duration and date that has not yet been tried as determined in step 512, lock microcontroller 104 hashes the combination in step 514 and returns to step 510. If there is no unhashed valid combination, then microcontroller 104 prohibits code entry through keypad 102 for a short period of time in step 516, before resetting and allowing entry of codes in step 520.

It is to be understood that many variations on the illustrated embodiment are within the scope of the present invention. For example, any suitable data acquisition/human interface device ("HID") will work in place of keypad 102, such as a touch screen, dial, magnetic strip reader or card reader, RFID reader/receiver, or Bluetooth® radio to interface with a cellular phone. For purposes of the present description, where applicable, a "user device" in conjunction with the HID may refer to the corresponding magnetic strip/card, RFID emitter, cellular phone, or any other personal electronic device adapted to submit data to the HID. The user need not enter numbers into the HID. Rather, any code that can be converted into a binary value will work, such as an alphanumeric code, or a selection of colors or pictures triggering a signal to microcontroller 104 having a particular binary value. If a non-numeric code is used, lock 100 will simply convert the non-numeric code into a binary sequence, and code server 118 will convert the binary sequence (generated in step 408 by a hash performed for a particular prospective time period) into the appropriate non-numeric code to display, or otherwise provide the non-numeric code to the user.

Lock 100 need not control access to a building or room; it could protect anything a normal lock protects, such as a safe, bicycle, or motor vehicle, for example, or instead of being a physical lock including mechanical locking mechanism 112, it could even be a password-protected portal that protects access to data or an electronic device, microcontroller 104 being programmed to grant that access whenever it is programmed to open locking mechanism 112/lock 100 in the above-described embodiments.

The lock mechanism need not be a traditional tumbler. It could be any lock mechanism, such as mechanical, electromagnetic, or other suitable type.

Backup battery 110 for clock 108 is optional, though preferred. Without it, when primary battery 114 is replaced, the time will have to be reset. Backup battery 110 could be replaced by another power source, such as a small capacitor that will provide power for a short time while primary battery 114 is replaced. Primary battery 114 could be replaced by any power source, such as the main A/C power to a building, for example.

Code server 118 need not be a web application. It could be a desktop app, a mobile app, a telephony- or SMS-based app, or any other piece of software that hashes an argument containing, as one or more variables or as part(s) of an input data string, a prospective time period, and preferably one or more lock-identifying codes, to return an access code 119.

Although only one method of getting secret code 204 into both code server 118 and lock 100 is described above, any method of putting a suitable lock identifying code into both will work. This could include generating the appropriate code in lock 100, displaying it, and having the user input secret code 204 into code server 118, or vice versa. The preferred embodiment makes it easier for a user to use a central code server 118 with the user's lock(s) 100, but it requires extra information to be stored by the manufacturer. If code server 118, lock 100, or the user generates secret code 204, less information has to be stored, but setup will involve one more step.

The foregoing describes effectively using two lock identifying codes, referred to as programming code 208 and secret code 204. This provides both the security of a long secret code 204 and the ease of remembering a shorter programming code 208. However, lock 100 could use an arbitrary number of lock identifying codes.

Additionally, it will be noted that the practical effect of hashing valid date and duration combinations with the lock identifying codes, however many there are, in accordance with the illustrated embodiment, instead of simply hashing the valid date and duration combinations by themselves, is to transform the stored hash function into a new hash function of only the valid date and duration combinations. If the lock identifying codes are unique to a particular lock 100, then the new hash function will also be unique to that lock 100. This practically assures that an access code 119 that is valid for one lock 100 at a given time will rarely be valid at the same time for another lock 100 having different lock identifying codes, so that providing a guest/customer an access code 119 for one lock 100 does not compromise the security of another lock 100. Including unique lock identifying data for each lock as part of the argument of one common hash function is only one of many conceivable ways of effectively creating a new hash function unique to each lock. However, one significant benefit of the above-described manner of effectively creating a unique hash function for each lock is that the new hash function is determined by programming code 208, which is created by the owner of lock 100, and can moreover be reset by the owner or any subsequent owner who has access to reset code 122. This gives the owner a measure of control over the security of lock 100, enabling the owner to ensure that no unauthorized user of lock 100 can compromise the security of lock 100, provided that reset code 122 is kept safe. Other suitable ways of creating a unique access code generating function for each lock are within the scope of the invention, but should preferably share the foregoing security benefit of the unique function being effectively determined by an act of the lock owner. For example, hashing the unique secret code 204 of lock 100 alone with the valid date/time combinations would be sufficient to effectively create a new unique hash function for each lock 100, but would not be preferred because it is the manufacturer and not the owner of lock 100 who programmed secret code 204, so that the owner would not have a chance to alter the function in a way that the owner could keep secret.

Alternatively, multiple locks 100 may share lock identifying codes. In this case, two or more locks 100 that all have the same lock identifying codes would be accessible with the same dynamic access code(s) 119 for any given time period. Anywhere that locks with the same keyset are currently useful, locks described in the present invention that have identical access codes, such as locks 100 having identical lock identifying codes, are also useful.

The preferred embodiment uses two parameters to define a stay period, which may be start date and duration, start date and end date, or duration and end date. However, any number and combination of variables and dates/times could be used to generate access codes 119. The more variables and combinations allowed, the more active access codes 119 at any one time, which reduces security. Security can be improved by lengthening access code 119 or by providing input variables to the lock, in addition to the input access code. In this manner, the lock does not have to hash every valid time period with every valid value for the variable. Instead, it hashes every valid time period with the input access code.

There are several ways to speed up processing at the expense of requiring additional memory. Principally, a caching system can be set up. The cache can be updated each day by calculating 14 new access codes 119 as they become valid and discarding the 14 expired access codes 119 from the day before. Or the cache could be updated only when a user enters a code. Or the cache could only store valid access codes 119 that have been entered, so that only one initial hashing operation would typically need to be performed for each guest stay period. Each of these methods makes tradeoffs on processing required after an access code 119 has been entered, memory required, and unneeded (and therefore unduly battery-draining) processing.

Figure 6:
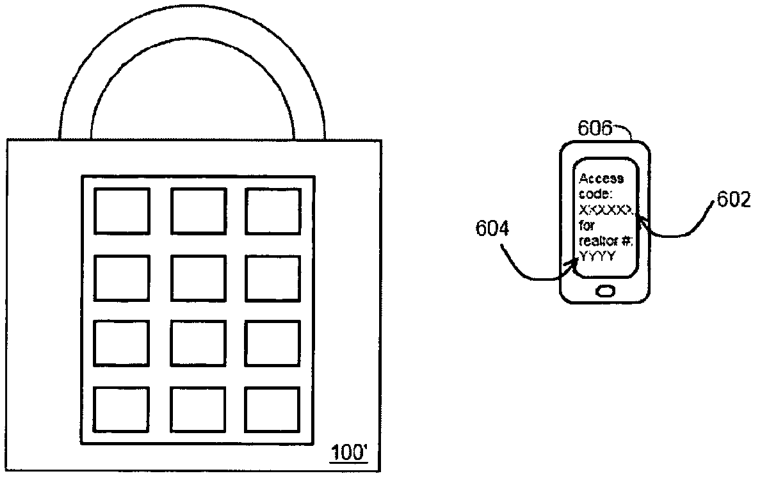
FIG. 6 shows a diagram of a lock in accordance with an alternate embodiment of the present invention useful for controlling access to properties shown by real estate agents.

The preferred embodiment describes a lock 100 that is useful for cabin rentals. Other embodiments will be useful for other use cases. For example, a dynamic access system for real-estate agents may be somewhat different. In accordance with one such embodiment, a key safe lock 100', as shown in FIG. 6, is equipped similarly to lock 100 but accepts different inputs as to be described. Each realtor receives a realtor ID 604 that uniquely identifies the realtor. A realtor access code 602 is a hash of realtor ID 604 and a date and time combination in addition to the secret code(s). Realtor access code 602 is valid, for example, for a time period extending from one hour before to one hour after the hashed time, providing a 2 hour window to open key safe lock 100'. The realtor would text a code server 118 requesting realtor access code 602, then enter realtor ID 604 and realtor access code 602 to open key safe lock 100' and retrieve the key to the house to be shown. Key safe lock 100' hashes all valid time windows with the entered realtor ID 604 and opens key safe lock 100' if a resulting hash equals the entered realtor access code 602.

A significant difference between key safe lock 100' and lock 100 is that part of the hashed argument of lock 100', namely, realtor ID 604, is manually input every time a user tries to unlock lock 100', rather than the entire hashed argument being determined by one or more stored values and a date and time polled from a clock as in lock 100. Other than being manually input as opposed to stored, realtor ID 604 with respect to lock 100' performs an analogous role to that of programming code 208 with respect to lock 100, transforming the hash function stored in lock 100' into a new unique hash function of only valid date and time combinations for each unique realtor ID 604. Optionally, but preferably, lock 100' will only accept as valid realtor ID input a realtor ID 604 that has actually been issued to a realtor, and lock 100' will not hash an entered sequence not issued to any realtor. Thus, for example, lock 100' could first prompt a user to enter a realtor ID, receive an entered realtor ID, and compare the entered realtor ID to a list stored in its memory of realtor ID's issued to realtors. Only if a match is found, will lock 100' hash realtor ID 604 with valid date and time combinations, and compare the resulting hashes with the input access code to determine whether to unlock key safe lock 100'. This provides multiple benefits; not only does realtor ID 604 provide additional security to lock 100', while being easy to remember for a realtor who routinely uses realtor ID 604, but also, an unauthorized user entering a random number sequence into lock 100' will only initiate a hash if the input realtor ID is valid. This can be made to be highly unlikely by providing a significant number of possible realtor ID's compared to the number of realtor ID's actually issued, typically by defining a numeric realtor ID as a sequence of a sufficient number of digits. In this manner, the microcontroller of key safe lock 100' is spared the battery-draining task of performing repeated hashes triggered by unauthorized attempts to open key safe lock 100'. This embodiment could be streamlined further by equipping the lock with a Bluetooth® radio that could receive realtor ID 604 and access code 602 directly from the realtor's mobile phone.

There could be additional time-based tests. For example check-in and check-out times could be enforced by lock microcontroller 104 checking if the current day falls on the first or last day of the duration authorized by the entered access code 119 and not allowing entry on the first day until, for example, 4 pm, and not allowing entry on the last day after, for example, 11 am.

In another embodiment of a lock, not requiring graphical illustration, a periodic time period of granted access is beneficially provided. For example, a cleaning person may need access to a rental unit every Thursday. To obtain an access code that will be valid at the appropriate cleaning times, a time period defined as every Thursday is thus used as an argument for the hash function, rather than an uninterrupted period between a discrete, start and end date/time. To verify an input access code, the lock would determine, from the date/time, the current recurring time period—in a preferred embodiment, the day of the week. Optionally, the recurring time period may be more specifically defined as certain hours of a certain day, for example, every Thursday from 8 A.M. to 11 A.M. The recurring time period may be automatically included in a set of valid hashable arguments as in step 508, or the lock may be programmed to hash only the recurring time period (with lock-identifying or other additional variables) when a cleaning person first enters a cleaning person ID/code, similarly to the realtor ID as in the embodiment discussed above with respect to key safe lock 100'. A Thursday access code would be valid every Thursday indefinitely, or until another variable in the hash, such as the programming code, was changed.

The preferred embodiment uses a microcontroller, a clock, and an optional time signal receiver and smart-phone interface. However, any combination of components that serve the same functions could be used. This includes a system-on-a-chip, and discrete microprocessor and memory components. The system-on-a-chip has the advantage that it could provide a more elegant and processor-intensive user interface, such as by driving a touch screen. At large production volumes, it may be advantageous to use chips that combine several of these functions on one piece of silicon.

Additional security and ease-of-use could be achieved by including optional time signal receiver 124 and time signal antenna 126, as mentioned briefly above and illustrated schematically in FIG. 1. Microcontroller 104 periodically poles time signal receiver 124 and sets clock 108 to the appropriate time, if necessary. Time signal receiver 124 could receive and process any appropriate time signal such as that from an NIST radio station or GPS satellite.

Given an absence of static access codes, a user cannot unlock the lock without first obtaining an access code from server 118. Thus, server 118 has a record of who had access to the lock's contents at any given time. While this may be sufficient for some purposes, a record of actual entries and attempted entries through the lock, as well as exact times, may be desirable. When this is desired, the microcontroller could be programmed to store in its memory a certain number, which may for example be 200, of most recent entries and attempted entries. The microcontroller could store, for example, the exact time, whether entry was successful, and the code used to enter/attempt entry. In addition to recording access attempts, the entry log data preferably can be conveyed to an authorized user. Any method of conveying this information is acceptable, such as displaying the information on a built in small LCD display or LED display or sending the information to a personal computing device (PCD) 700.

Figure 7:
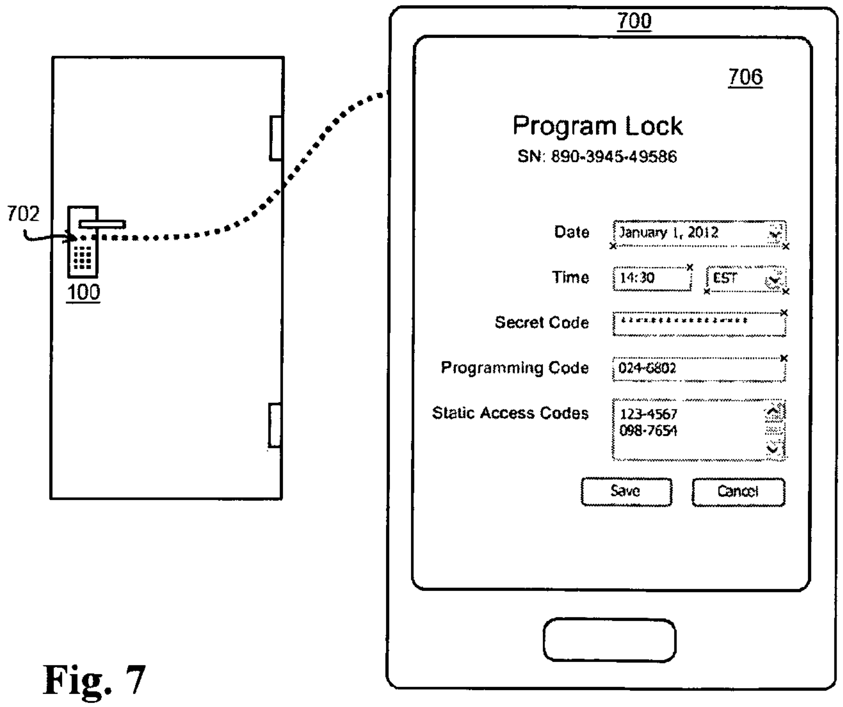
FIG. 7 shows a diagram of a lock in accordance with an alternate embodiment of the present invention that eases administration of locks.

With reference to FIG. 7, a PCD-linked embodiment of lock 100 is illustrated in which the programming and/or reset mode includes the ability to interact with PCD 700, which may for example be a smartphone or laptop, or a USB thumb drive. In a preferred embodiment, once lock 100 is in programming mode, such as by the user entering the programming or reset codes, lock 100 will send and receive data to and from PCD 700. Lock 100 will communicate with PCD 700 and allow all, or an authorized subset of, programming functions to be performed. This includes, but is not limited to, changing lock identifying codes, adding static access codes, changing the date/time, reviewing entry logs, and setting check in/check out times. In a preferred embodiment, microcontroller 104 communicates with PCD 700 through interface 128, an optional component mentioned briefly above and illustrated schematically in FIG. 1. Suitable interfaces 128 include, but are not limited to, 802.11x, Bluetooth®, or USB. PCD 700 has an application providing a rich user interface 706 to lock 100. The application sends commands to, and receives information from lock microcontroller 104 via interface 128.

A preferred method for interacting with PCDs is by providing a USB host interface. PCD 700 would connect through USB port 702 as a USB device and the user would interact with an application on PCD 700. PCD 700 would transmit the actions of the user to lock microcontroller 104. A USB host has the advantage that, not only can it communicate with a PCD, but it could allow easy administration of multiple locks by reading a configuration file off of a USB thumb drive.

Some security measures that can be used to secure the secret code(s), programming code, and reset code on a central server are briefly described herein. However, it is within the scope of the invention for alternate or additional security measures to be used to secure the secret code(s).

While the invention has been described with respect to certain preferred embodiments, as will be appreciated by those skilled in the art, it is to be understood that the invention is capable of numerous changes, modifications and rearrangements, and such changes, modifications and rearrangements are intended to be covered by the following claims.

What is claimed is:

1. An electronic lock for dynamic controlled access comprising a mechanical locking mechanism;

a clock;

a microprocessor;

a memory storing a hash function and instructions for identifying, based at least partly on a current time, at least two currently valid arguments to be hashed by the hash function to produce a hash, each of the currently valid arguments comprising a currently valid time period that includes the current time, at least two of the currently valid time periods being different time periods, the hash of each currently valid argument returning a currently valid access code, such that at least two respective access codes are valid at the current time; and a human interface device configured to permit a human user to input an access code and to transmit the input access code to the microprocessor;

the memory further containing programmed instructions for the microprocessor to receive a signal from the clock indicating the current time, receive the input access code transmitted from the human interface device, compare the input access code to one of the currently valid access codes, the one of the currently valid access codes having been returned by the microprocessor identifying and hashing one of the currently valid arguments, to determine whether the input access code equals the returned valid access code, if the input access code does not equal the returned currently valid access code and the input access code has not yet been compared to all of the currently valid access codes, compare the input access code to another currently valid access code returned by the microprocessor hashing another one of the currently valid arguments, at least until either the input access code is determined to equal one of the currently valid access codes or the input access code has been compared to all of the currently valid access codes and does equal any of the currently valid access codes, and if the input access code is determined to equal one of the currently valid access codes, unlock the mechanical locking mechanism.

2. The electronic lock of claim 1, an invalid input failure defined as the input access code being compared to the currently valid access code corresponding to each currently valid argument and no match being found, the lock further programmed with instructions to prohibit access code input via the human interface device for a predetermined amount of time if a predetermined impermissible number of input failures have occurred within a predetermined time interval.

3. The electronic lock of claim 1, further comprising a time signal receiver and a time signal antenna, the microprocessor further programmed with instructions to periodically receive a time signal from the time signal receiver and update the clock to the current time as indicated by the time signal.

4. The electronic lock of claim 1, further comprising a personal computing device (PCD) interface, the lock, when in a programming mode, being further programmed with instructions to accept programming instructions from a PCD through the PCD interface.

5. The electronic lock of claim 4, the lock further programmed with instructions to enter the programming mode when the microprocessor authenticates, through the PCD interface, a PCD that has been authorized to interact with the electronic lock.

6. The electronic lock of claim 1, further comprising a personal computing device (PCD) interface, the lock further programmed with instructions to send data to a PCD through the PCD interface.

7. The electronic lock of claim 1, the currently valid time periods at any given current time comprising at least two time periods of different duration.

8. The electronic lock of claim 1, the currently valid time periods comprising at least two time periods having a different start time.

9. The electronic lock of claim 1, there being at least four currently valid time periods valid at any given time.

10. The electronic lock of claim 1, the currently valid time periods including a set of continuous, non-recurring time periods, each time period of the set beginning at a single start time and ending at a single end time.

11. The electronic lock of claim 10, the set of continuous, non-recurring time periods including a time period corresponding to each of the set of sequences of consecutive days ranging from one day to n days and including the current day, each time period including at least a part of the first day and at least a part of the last day of the corresponding sequence and the entirety of any days in between, and each of the time periods including the current time.

12. The electronic lock of claim 11, wherein n is at least 7.

13. The electronic lock of claim 1, the currently valid time periods including at least one periodically recurring time period.

14. The electronic lock of claim 1, the currently valid time periods including at least one periodically recurring time period and at least two discrete, uninterrupted time periods, each discrete time period beginning at a single start time and ending at a single end time.

15. The electronic lock of claim 1, each valid argument further including data input into the human interface device in addition to the input access code each time an access code is input into the human interface device.

16. The electronic lock of claim 15, the memory further storing a user ID, the lock further programmed with instructions to compare the additional input data to the user ID, and the instructions to hash currently valid arguments being subject to the condition that the additional input data equal the user ID.

17. The electronic lock of claim 1, each currently valid argument further including a secret code associated with the electronic lock.

18. The electronic lock of claim 17, the secret code being pre-set, and each currently valid argument further including a programming code that is selected by a user and stored in the electronic lock.

19. The electronic lock of claim 1, the lock further programmed with instructions to cache a currently valid access code;

each time an input access code is received, if any currently valid access code is cached, compare the input access code to at least one cached currently valid access code; and if a match is found, unlock the mechanical locking mechanism.

20. The electronic lock of claim 1, the lock further programmed with instructions to each time an argument becomes currently valid according to the instructions stored in the memory for identifying currently valid arguments, hash automatically the newly valid argument to return a corresponding newly valid access code, and cache automatically the newly valid access code in a memory, each time a cached access code ceases to be valid, delete automatically the newly invalid access code from the memory, each time an input access code is received, compare the input access code to any currently valid access codes cached in the memory at least until a match is found between the input access code and one of the currently valid access codes cached in the memory or the input access code has been compared with all the currently valid access codes cached in the memory and no match has been found, and if a match is found, unlock the mechanical locking mechanism.

21. The electronic lock of claim 1, the lock further programmed with instructions to each time an argument becomes currently valid according to the instructions stored in the memory for identifying currently valid arguments, cache automatically the newly valid argument in a memory, each time a cached argument ceases to be valid, delete automatically the newly invalid argument from the memory, each time a currently valid argument is hashed to return a currently valid access code, automatically cache the currently valid access code in the memory and automatically delete the corresponding currently valid argument from the memory, each time an access code in the memory ceases to be valid, automatically delete the newly invalid access code from the memory, each time an input access code is received, compare the input access code to any currently valid access codes cached in the memory at least until a match is found between the input access code and one of the valid access codes cached in the memory or the input access code has been compared with all the cached currently valid access codes and no match has been found, if a match is found between the input access code and one of the cached currently valid access codes, unlock the mechanical locking mechanism, if and when the input access code has been compared with all the cached currently valid access codes, no match has been found, and any currently valid argument remains cached in the memory, compare the input access code to a newly calculated currently valid access code returned by the microprocessor hashing a remaining cached currently valid argument at least until a match is found or no currently valid arguments remain in the memory and no match has been found, and if a match is found between the input access code and one of the newly calculated currently valid access codes, unlock the mechanical locking mechanism.

22. The electronic lock of claim 1, further comprising a static access code stored in the lock memory, the lock further programmed with instructions to compare the input access code to the static access code, and if the input access code equals the static access code, unlock the mechanical locking mechanism.

23. The electronic lock of claim 1, the lock further programmed with instructions to store in the lock memory for a predetermined time a log of recent access attempts, the log including, for each attempt, data indicating:

the time of the attempt, and whether the attempt was successful.

24. A security system for dynamic controlled access comprising an electronic lock comprising a mechanical locking mechanism;

a clock;

a microprocessor;

a memory storing a hash function and instructions for identifying, based at least partly on a current time, at least two currently valid arguments to be hashed by the hash function, each of the currently valid arguments comprising a time period that includes the current time, the time periods comprised in the currently valid arguments collectively being the currently valid time periods, at least two of the currently valid time periods being different time periods, the hash of each currently valid argument returning a currently valid access code, such that at least two respective access codes are valid at the current time; and a human interface device configured to permit a human user to input an access code and to transmit the input access code to the lock microprocessor;

the lock memory further containing programmed instructions for the lock microprocessor to receive a signal from the clock indicating the current time, receive the input access code transmitted from the human interface device, compare the input access code to one of the currently valid access codes, the one of the currently valid access codes having been returned by the microprocessor identifying and hashing one of the currently valid arguments, to determine whether the input access code equals the returned valid access code, if the input access code does not equal the returned currently valid access code and the input access code has not yet been compared to all of the currently valid access codes, compare the input access code to another currently valid access code returned by the microprocessor hashing another one of the currently valid arguments, at least until either the input access code is determined to equal one of the currently valid access codes or the input access code has been compared to all of the currently valid access codes and does not equal any of the currently valid access codes, and if the input access code is determined to equal one of the currently valid access codes, unlock the mechanical locking mechanism; and a code server comprising a microprocessor and a memory storing the same hash function stored in the lock memory, the code server programmed with instructions to prompt a user to enter a prospective time period for which access to the lock is desired, to evaluate the hash function at the argument corresponding to a time period entered by a user via a user device to return a corresponding access code, and to transmit the corresponding access code to the user, the transmitted access code being valid during the entered prospective time period.

25. The system of claim 24, the instructions to transmit the corresponding access code to the user comprising instructions to transmit the access code to a user device, the code server further programmed with instructions to cause the access code transmitted to the user device to be displayed on a display device operatively connected to the user device, and the lock human interface device including manual entry means for inputting the displayed access code.

26. The system of claim 24, the instructions to transmit the corresponding access code to the user comprising instructions to transmit the access code to a user device, and the lock human interface device being adapted to read the transmitted access code from the user device when a user presents the user device to the human interface device.

27. The system of claim 24, the code server memory storing a plurality of hash functions and their respective correspondence to a plurality of electronic locks including said electronic lock and other electronic locks, the code server further programmed with instructions to prompt a user to enter information identifying a lock, and, upon receiving information identifying one of the plurality of electronic locks, to determine the hash function corresponding to the identified lock, and to evaluate the hash function corresponding to the identified lock at the argument corresponding to the entered time period to return an access code valid for the identified lock during the entered time period.

28. The system of claim 27, each of the plurality of hash functions being unique with respect to the rest of the plurality of hash functions.

29. The system of claim 27, the plurality of hash functions including at least two identical hash functions.

30. The system of claim 27, each of the plurality of hash functions being generated from a common hash function by aggregating to the argument of each hash function a lock identifying code.

31. The system of claim 27, the information identifying the lock including a reset code provided to the lock owner upon purchase of the lock and a lock serial number, the code server memory storing in association with the lock identifying information a hash of a lock verification argument including at least the reset code, the lock serial number, and a security key stored in the code server, without the code server storing the reset code itself, and the code server further programmed with instructions to prompt a user to input the reset code, to hash the lock verification argument to generate a lock verification hash, and to compare the lock verification hash with the stored hash, the instruction to evaluate the hash function at the argument corresponding to the entered time period to generate the access code valid for the identified lock during the time period being subject to the condition that the lock verification hash equal the stored hash.

32. The system of claim 30, the lock identifying code comprising a programming code selected and stored in the code server and in the lock memory by a user.

33. The system of claim 30, the lock identifying code comprising a pre-set secret code stored in the code server and in the lock memory.

34. The system of claim 24, further comprising a static access code stored in the lock memory, the lock further programmed with instructions to compare the input access code to the static access code, and if the input access code equals the static access code, unlock the mechanical locking mechanism.

35. The system of claim 34, the code server memory further storing the static access code and the code server further programmed with instructions to transmit the static access code to the user.

36. A method of providing dynamic controlled access comprising providing an electronic lock including a mechanical locking mechanism;

a clock ;

a microprocessor;

a memory storing a hash function and instructions for identifying, based at least partly on a current time, at least two currently valid arguments to be hashed by the hash function, each of the currently valid arguments comprising a time period that includes the current time, the time periods comprised in the currently valid arguments collectively being the currently valid time periods, at least two of the currently valid time periods being different time periods, the hash of each currently valid argument returning a currently valid access code, such that at least two respective access codes are valid at the current time; and a human interface device configured to permit a human user to input an access code and to transmit the input access code to the lock microprocessor;

the lock memory further containing programmed instructions for the lock microprocessor to receive a signal from the clock indicating the current time, receive the input access code transmitted from the human interface device, compare the input access code to one of the currently valid access codes, the one of the currently valid access codes having been returned by the microprocessor identifying and hashing one of the currently valid arguments, to determine whether the input access code equals the returned valid access code, if the input access code does not equal the returned currently valid access code and the input access code has not yet been compared to all of the currently valid access codes, compare the input access code to another currently valid access code returned by the microprocessor hashing another one of the currently valid arguments, at least until either the input access code is determined to equal one of the currently valid access codes or the input access code has been compared to all of the currently valid access codes and does not equal any of the currently valid access codes, and if the input access code is determined to equal one of the currently valid access codes, unlock the mechanical locking mechanism; and providing to a guest before the start of a prospective access time period a guest access code that will be valid during the prospective access time period.

37. The method of claim 36, said providing a guest access code comprising evaluating the hash function at the argument including the prospective access time period to obtain the guest access code, and said evaluating the hash function comprising storing the hash function in a code server without the code server communicating with the lock; and inputting the prospective access time period into the code server to cause the code server to evaluate the hash function at the argument including the prospective time period to generate and display the guest access code.

38. An electronic lock for dynamic controlled access comprising a mechanical locking mechanism;

a clock configured to track the current time;

a microprocessor;

a memory storing a hash function; and a human interface device configured to permit a human user to input an access code and to transmit the access code input by the human user to the microprocessor;

the memory containing programmed instructions for the microprocessor to receive a signal from the clock to determine the current time, receive a signal from the human interface device indicating the input access code, determine a plurality of valid arguments for the hash function, each of the valid arguments including data representing a valid time period, each valid time period including the current time, the evaluation of the hash function at each of the valid arguments returning a valid access code that is a hash of the valid argument, each valid argument and each valid access code remaining valid during the corresponding time period, evaluate the hash function at a first one of the valid arguments to return a first valid access code corresponding to the first valid argument, compare the input access code to the first valid access code to determine whether the input access code equals the first valid access code, for each time the input access code is compared to a valid access code and does not match the valid access code, hash another of the valid arguments to return another valid access code, and compare the input access code to the other valid access code until either the input access code equals one of the valid access codes or the input access code has been compared to all of the valid access codes and does not match any of the valid access codes, and if the input access code is compared to one of the valid access codes and equals the valid access code, unlock the mechanical locking mechanism;

the lock further programmed with instructions to each time an argument becomes valid, hash automatically the newly valid argument to return the corresponding valid access code, and cache automatically the corresponding valid access code in a memory, each time a valid access code becomes invalid, delete automatically the newly invalid access code from the memory, each time an input access code is received, compare the input access code to any valid access codes cached in the memory until a match is found between the input access code and one of the valid access codes cached in the memory or the input access code has been compared with all the valid access codes cached in the memory and no match has been found, and if a match is found, unlock the mechanical locking mechanism.

39. An electronic lock for dynamic controlled access comprising a mechanical locking mechanism;

a clock configured to track the current time;

a microprocessor;

a memory storing a hash function; and a human interface device configured to permit a human user to input an access code and to transmit the access code input by the human user to the microprocessor;

the memory containing programmed instructions for the microprocessor to receive a signal from the clock to determine the current time, receive a signal from the human interface device indicating the input access code, determine a plurality of valid arguments for the hash function, each of the valid arguments including data representing a valid time period, each valid time period including the current time, the evaluation of the hash function at each of the valid arguments returning a valid access code that is a hash of the valid argument, each valid argument and each valid access code remaining valid during the corresponding time period, evaluate the hash function at a first one of the valid arguments to return a first valid access code corresponding to the first valid argument, compare the input access code to the first valid access code to determine whether the input access code equals the first valid access code, for each time the input access code is compared to a valid access code and does not match the valid access code, hash another of the valid arguments to return another valid access code, and compare the input access code to the other valid access code until either the input access code equals one of the valid access codes or the input access code has been compared to all of the valid access codes and does not match any of the valid access codes, and if the input access code is compared to one of the valid access codes and equals the valid access code, unlock the mechanical locking mechanism;

the lock further programmed with instructions to each time an argument becomes valid, cache automatically the newly valid argument in a memory, each time a cached valid argument becomes invalid, delete automatically the newly invalid argument from the memory, each time a valid argument is hashed to return a valid access code, automatically cache the valid access code in the memory and automatically delete the corresponding valid argument from the memory, each time a valid access code in the memory becomes invalid, automatically delete the newly invalid access code from the memory, each time an input access code is received, compare the input access code to any valid access codes cached in the memory until a match is found between the input access code and one of the valid access codes cached in the memory or until the input access code has been compared with all the cached valid access codes and no match has been found, if a match is found between the input access code and one of the cached valid access codes, unlock the mechanical locking mechanism, if and when the input access code has been compared with all the cached valid access codes, no match has been found, and any valid argument remains cached in the memory, hash each remaining cached valid argument in turn to return a newly calculated valid access code and compare the input access code to each newly calculated valid access code until a match is found or until no valid arguments remain in the memory and no match has been found, and if a match is found between the input access code and one of the newly calculated valid access codes, unlock the mechanical locking mechanism.

40. A security system for dynamic controlled access comprising an electronic lock comprising a mechanical locking mechanism;

a clock configured to track the current time;

a microprocessor;

a memory storing a hash function; and a human interface device configured to permit a human user to input an access code and to transmit the access code input by the human user to the lock microprocessor;

the lock memory containing programmed instructions for the microprocessor to receive a signal from the clock to determine the current time, receive a signal from the human interface device indicating the input access code, determine a plurality of valid arguments for the hash function, each of the valid arguments including data representing a time period that includes the current time, the evaluation of the hash function at each of the valid arguments returning a valid access code that is a hash of the valid argument, each valid argument and each valid access code remaining valid during the corresponding time period, evaluate the hash function at a first one of the valid arguments to return a first valid access code corresponding to the first valid argument, compare the input access code to the first valid access code to determine whether the input access code equals the first valid access code, for each time the input access code is compared to a valid access code and does not match the valid access code, hash another of the valid arguments to return another valid access code, and compare the input access code to the other valid access code until either the input access code equals one of the valid access codes or the input access code has been compared to all of the valid access codes and does not match any of the valid access codes, and if the input access code is compared to one of the valid access codes and equals the valid access code, unlock the mechanical locking mechanism; and a code server comprising a microprocessor and a memory storing the same hash function stored in the lock memory, the code server programmed with instructions to prompt a user to enter a prospective time period for which access to the lock is desired, to evaluate the hash function at the argument corresponding to a time period entered by a user via a user device to return a corresponding access code, and to transmit the corresponding access code to the user, the transmitted access code being valid during the entered time period;

the code server memory storing a plurality of hash functions and their respective correspondence to a plurality of electronic locks including said electronic lock and other electronic locks, and the code server further programmed with instructions to prompt a user to enter information identifying a lock, and, upon receiving information identifying one of the plurality of electronic locks, to determine the hash function corresponding to the identified lock, and to evaluate the hash function corresponding to the identified lock at the argument corresponding to the entered time period to return an access code valid for the identified lock during the entered time period.

* * * * *